United States Patent [19]

Bodine et al.

[11] Patent Number: 4,984,220

[45] Date of Patent: Jan. 8, 1991

[54] GEOPHYSICAL EXPLORATION USING VELOCITY SPECTRA REGIONAL COHERENCY PEAKS

[75] Inventors: John H. Bodine, Houston, Tex.; John N. Gallagher; James H. Wright, both of Tulsa, Okla.

[73] Assignee: Amoco Corporation, Chicago, Ill.

[21] Appl. No.: 319,608

[22] Filed: Mar. 6, 1989

[51] Int. Cl.$^5$ .......................... G01V 1/28; G01V 1/34
[52] U.S. Cl. ...................................... 367/68; 364/421
[58] Field of Search .................. 367/50, 51, 52, 68, 367/72, 59, 60, 74; 364/421

[56] References Cited

U.S. PATENT DOCUMENTS

| | | | |
|---|---|---|---|
| 4,479,205 | 10/1984 | Grey | 367/63 |
| 4,740,928 | 4/1988 | Gutowski et al. | 367/27 |
| 4,802,146 | 1/1989 | Moeckel | 367/52 |
| 4,802,147 | 1/1989 | Moeckel | 367/52 |
| 4,849,887 | 7/1989 | Skylas | 367/52 |

OTHER PUBLICATIONS

"Software Products for Exploration", CogniSeis Development, 2401 Portsmouth, Houston, Tex. 77098-3903—see pp. 12–13.
"Interactive Disco Product: IVIS, SIRS, IGS, INTER-VIEW", CogniSeis Development, 2401 Portsmouth, Houston, Tex. 77098-3903—see pp. 1–13.
"Advanced Ivis", CogniSeis Development, 2401 Portsmouth, Houston, Tex. 77098-3903.

*Primary Examiner*—Ian J. Lobo

[57] ABSTRACT

Regional coherency maxima are displayed in various domains and interactively edited to produce stacking velocity functions, horizon velocity functions, and sets of edited velocity spectra regional coherency peaks for use in geophysical exploration for oil and gas.

39 Claims, 12 Drawing Sheets

GEOPHYSICAL EXPLORATION USING VELOCITY SPECTRA REGIONAL COHERENCY PEAKS

FIELD OF THE INVENTION

The invention relates to the processing and interpretation of seismic traces and in particular aspects to velocity analysis for determining stacking velocity functions, horizons and horizon velocity functions.

SETTING OF THE INVENTION

Seismic data provides an indirect measurement of velocity with which seismic waves travel in the earth as a function of depth. Sonic logs are usually considered to provide a more direct measurement. Based on these, the explorationist derives velocities such as interval, apparent, average, root-mean-square (RMS), instantaneous, phase, group, normal moveout (NMO), stacking and migration velocities.

The common midpoint (CMP) gather technique of seismic exploration significantly contributes to identification of primary reflections against a background of noise. The CMP gather represents multifold seismic data obtained at locations in the subsurface by sampling them repeatedly by seismic initiations (shots) at different source locations while an array of receivers is stationary or is rolled past the locations. The result is a set of seismic traces which is or can be sorted to produce CMP gathers, which can then be processed, for example, by normal moveout (NMO) correction, statics correction, and the like to produce processed CMP gathers which can be used to generate a stacked seismic section in the time-CMP domain usually referred to herein as the T-X domain. Velocity estimates made in various ways during processing can also be displayed in velocity displays.

The velocity that can readily be derived from seismic data is the stacking velocity. Stacking velocity can be related to NMO velocity which in turn can be related to RMS velocity from which average and interval velocities can be derived.

Velocity analysis is the process of determining a stacking velocity function for the stacking of CMP gathers. The stacked seismic section of NMO-corrected CMP gathers is a fundamental tool used in exploration for oil and gas. The term velocity analysis is also sometimes used to refer to subsequent processing used for detailed velocity determinations. The stacking velocity required is that producing maximum coherency in the primary reflection data. Often, this velocity is known simply as the stacking velocity. It is also sometimes referred to as maximum coherency stacking velocity, moveout velocity, normal moveout velocity, CMP velocity, and the like.

Normal moveout (NMO) is the time shift that must be applied to a reflection time ($T_x$) of a seismic signal received by a receiver having offset X to reduce it to the time $T_0$ that would have been recorded at zero offset (normal incidence). Accordingly, the NMO can be given by $$\Delta T = T_x - T_0$$

For each trial stacking velocity, V, NMO corrections are applied to each of the traces of the CMP as a function Time (depth) according to $$\Delta T = \left( T_0^2 + \frac{X^2}{V^2} \right)^{\frac{1}{2}} - T_0 \quad (1)$$

or a similar relationship.

Velocity analysis conventionally consists of time shifting traces in a CMP gather using assumed values of V and T and evaluating the coherence of the resulting time shifted traces, i.e., the extent to which the different traces after time shifting are in-phase. Typically, a wide range of values for V and virtually all T (traveltimes) of a CMP gather record, typically spanning about 6000 msec (milliseconds) must be evaluated. The evaluation can involve, for example, generating measures of coherency over a range of V for a time T, then incrementing time T and again generating measures of coherency over a range of V for the incremented time T, and continuing the process until the full range of seismic traveltimes is covered. Alternatively, the evaluation can involve, for example, generating measures of coherency over a range of time T± a selected time increment $t_i$, then incrmenting T by $t_i$ and continuing the process until the full range of seismic traveltimes is covered.

Velocity analysis can be further constrained by stacking velocity fairway editing as is known in the art before or after generating such measures of coherency. A stacking velocity fairway is simply a band of possible stacking velocities in the T-V (time-velocity) domain within which one searches for velocity picks (regional coherency maxima) for generating a stacking velocity function.

The results of velocity analysis for a given CMP location along a seismic line is a set {(T,V,X,C)} of data which can be displayed in a velocity spectrum, for example, with coherency contoured (T,V,C) data plotted therein at various positions X in the time-velocity (T-V) domain. Thus, FIG. 1A illustrates velocity spectra having coherency-contoured (T,V,C) data plotted therein at positions X along a seismic line of exploration.

A high value of coherency implies that similar energy is arriving on all of the traces and that the corresponding stacking velocity function will move the traces in phase. Ideally, a velocity spectrum is produced for each CMP gather and evaluated to determine which velocity function best aligns the seismic traces in the gather, that is, produces the maximum coherency.

The velocity spectra allow the explorationist to distinguish between primary and multiple reflections and also to determine a stacking velocity function for use in stacking CMP gathers. Referring to FIG. 1A, a stacking velocity function is illustrated by the dashed line labeled F(T,V) connecting regional coherency maxima from shallow to middle to deep events as indicated by increasing traveltime. It can be seen that the stacking velocity function generally tracks regional coherency maxima. Regional coherency maxima are coherency peaks on a region-by-region basis in the T-V domain regardless of whether the regional coherency peaks are the highest in absolute value. In fact, coherency peaks associated with multiples are often higher in absolute value than coherency peaks associated with primary reflections so the use of relative or regional coherency peaks is preferred and even necessary.

Frequently, velocity spectra are produced at spaced apart more or less regular intervals along the seismic line. In principle, it is desirable to produce velocity spectra at closely spaced or even at every CMP location to improve accuracy of resulting stacked seismic sections as shown in FIG. 1A. However, since each point on a velocity spectrum represents a (T,V,X,C) datum, such a complete set {(T,V,X,C)} of velocity spectral data constitutes a monumental set with accompanying difficulties of processing and interpretation.

The typical procedure has therefore been to produce and examine velocity spectra at intervals spaced apart along the seismic line in hardcopy. This examination leads to further refinement of the traveltime/stacking velocity fairways, selection of stacking velocity function, and production of tentative NMO corrected stacked sections until the explorationist is reasonably satisfied with the result. This procedure is tedious and time consuming and may use only a small portion of the data available in arriving at the final stacking velocity and other functions.

It is desirable to increase the amount of data taken into consideration in arriving at stacking velocity functions for stacking seismic data and to reduce the time and difficulty required by the typical procedure in arriving at reliable stacked seismic sections and in arriving at reliable migrated velocity and interval velocity information and displays.

It is further desirable to provide apparatus and method for determining horizon velocity functions and for increasing the reliability and usefulness of such functions.

It is further desirable to provide apparatus and method for editing velocity spectra regional coherency peaks and for producing functions and subsets of edited peaks for use in geophysical exploration.

SUMMARY OF THE INVENTION

In accordance with the invention, there is provided means for selectively viewing seismic velocity spectra regional coherency peaks interactively in three dimensions with various subsets of regional coherency peaks being projected to the display. The invention provides for stacking velocity fairway editing and stacking velocity function determination in a time-stacking velocity (T-V) domain, horizon determination and horizon velocity calculation in a time-distance (T-X) domain, and horizon velocity function editing and determination in a velocity-distance (V-X) plane. The regional coherency peaks may be selectively viewed in any of the domains with various selected sets of peaks being projected to the display.

According to the invention, a selected set of velocity spectra regional coherency peaks {(T,V,X,C')} is projected and displayed in at least one of the T-V, T-X, and V-X domains and a function is delimited in the displayed domain by operations functionally connected to the displayed domain. The set of velocity spectra regional coherency peaks {(T,V,X,C')} comprises traveltime T and velocity V locations of regional coherency maxima C' on velocity spectra in T-V domain(s) at position(s) X along a seismic line of exploration. The set {(T,V,X,C')} is produced from a set {(T,V,X,C)} by condensing velocity spectra data (T,V,C) at positions X along a seismic line by representing only the regional coherency peaks or maxima C' by location (T,V,X). The effect of this data condensation is to significantly reduce the quantity of data for processing.

According to a further broad aspect of the invention, the invention comprises determining at least one window $\Delta$ in X,V,T, for T-V, T-X, V-X domains respectively and for producing a selected window set $\Delta$ {(T,V,X,C')} of a set {(T,V,X,C')}. A selected window set $\Delta$ can then be projected and displayed in a respective domain, for example, the $\Delta$X window set can be projected and displayed in a T-V domain, a $\Delta$V window set can be projected and displayed in a T-X domain, and a $\Delta$T window set can be projected and displayed in a V-X domain. A window $\Delta$X comprises two or more X values in the X dimension and windows $\Delta$T and $\Delta$V comprise a range of values in the T and V dimensions.

The invention can further comprise determining a range of a values T, V, or X for a window $\Delta$ in a selected one of T, V, or X and positioning the selected window $\Delta$ at a selected location along the T, V, or X axis.

According to a further broad aspect, the invention comprises delineating at least one of fairways $R_{TV}$, $R_{TX}$, $R_{VX}$ for T-V, T-X, and V-X domains respectively by operations functionally related to a respective displayed domain. The resulting delineated fairway sets R {(T,V,X,C')} can then be projected and displayed in selected domain(s).

According to further broad aspect of the invention, there are provided apparatus and method for editing regional coherency peaks of velocity spectra along a seismic line by obtaining the union and/or intersection of window sets, fairway sets, functions, and the like which can be delimited in respective domains by operations functionally connected to the domains.

The invention can further comprise assigning third variable visual values to a selected third variable for representing the third variable in a selected two-dimensional domain selected from T-V, T-X, and V-X domains. In particular, visual values can be assigned to a selected one of coherency peaks C' magnitude or position X for displaying a selected third variable in the T-V domain. Likewise, visual values can be assigned to a selected one of coherency peaks C' magnitude and velocity V for display in a T-X domain. According to a further aspect, visual values can be assigned to selected horizons in a T-X domain for display in other domains.

In a further aspect, the invention includes generating stacking velocity functions. A window $\Delta$X is determined having a range of two or more X values and at a selected position on the X axis and the window set $\Delta$X {(T,V,X,C')} is projected and displayed in the T-V domain. Then, a stacking velocity function is delimited in the displayed domain by operations functionally connected to the displayed domain.

The invention can also include steps and apparatus for generating sets {(T,V,X,C')} which are operated on according to other aspects of the invention. Thus, the invention can comprise delineating at least a fairway $R_{TV}$ in a T-V domain and delineating a fairway $R_{TX}$ in the T-X domain by operations functionally related to displays in the T-V and T-X domains respectively for producing an $R_{TV}$ fairway set {(T,V,X,C')} and an $R_{TX}$ fairway set $R_{TX}$ {(T,V,X,C')}. Then, a union set can be produced by obtaining the union of the $R_{TV}$ fairway set and the $R_{TX}$ fairway set and the resulting union set can be projected and displayed in the T-V domain. Then, a stacking velocity function can be delimited in the T-V domain by operations functionally related to the display domain.

The means for delineating the $R_{TV}$ fairway can comprise window means for determining $\Delta$X windows at at least two spaced apart positions along the X axis (seismic line) and for producing at least two $\Delta$X window sets. Then, $R_{TV}$ fairways can be delineated on projected displays of each of the $\Delta X$ window sets by operations functionally related to respective displays. The thus-delineated $R_{TV}$ fairways can then be interconnected for producing an $R_{TV}\{(T,V,X)\}$ fairway set in T,V,X space. An $R_{TX}$ fairway can also be delineated in T,V,X space for producing an $R_{TX}\{(T,V,X)\}$ fairway set in T,V,X space. Then, the $R_{TV}\{(T,V,X)\}$ and the $R_{TX}\{(T,V,X)\}$ fairway sets can be unioned to produce a union set for display and picking of a stacking velocity function in the T-V domain.

According to another particular aspect of the invention, the invention comprises means for determining a horizon velocity function in the T-X and V-X domains. Thus, a fairway $R_{TX}$ can be delineated in a T-X domain and/or a horizon function F(T,X) can be delineated in a T-X domain by operations functionally connected to displays in the T-X domain. Visual values can be assigned to a third variable such as coherency peak C' magnitude for displaying coherency magnitude in the T-X domain and velocity values can be associated with a delimited horizon fairway or function in the T-X domain. A delimited horizon fairway or function having associated velocity values can be projected and displayed in the V-X domain and a horizon velocity function can be delimited in the V-X domain by operations functionally connected to the displayed V-X domain. According to a further aspect, visual values can be associated with particular selected delimited horizon functions to facilitate viewing in the V-X domain.

DETAILED DESCRIPTION OF THE INVENTION

The method and apparatus of the invention are directed to processing a set of regional coherency peaks $\{(T,V,X,C')\}$ such as produced from a set of velocity spectra data $\{(T,V,X,C)\}$ at a plurality of locations X along a seismic line.

The set of velocity spectra data $\{(T,V,X,C)\}$ can be produced using velocity spectra techniques such as those described above or otherwise available to those skilled in the art or their equivalents. Software is commercially available for such analysis and suitable techniques are also well known. Further description is therefore not necessary.

From the $\{(T,V,X,C)\}$ data, a subset $\{(T,V,X,C')\}$ of data can be selected manually or by using a suitable algorithm for detecting locations of regional coherency peaks (T,V,X,C') or by combining manual and machine picking. Such programs can be readily produced by defining regions in the T-V domain of velocity spectra based on increasing coherency values therein relative to lower coherency values between defined regions, and then selecting the location (T,V) of coherency peaks C' in each region for velocity spectra at locations X along a seismic line. Such picking programs are commercially available or can be generated by the skilled programmer from the description herein and need not be described in detail.

Figure 1A:
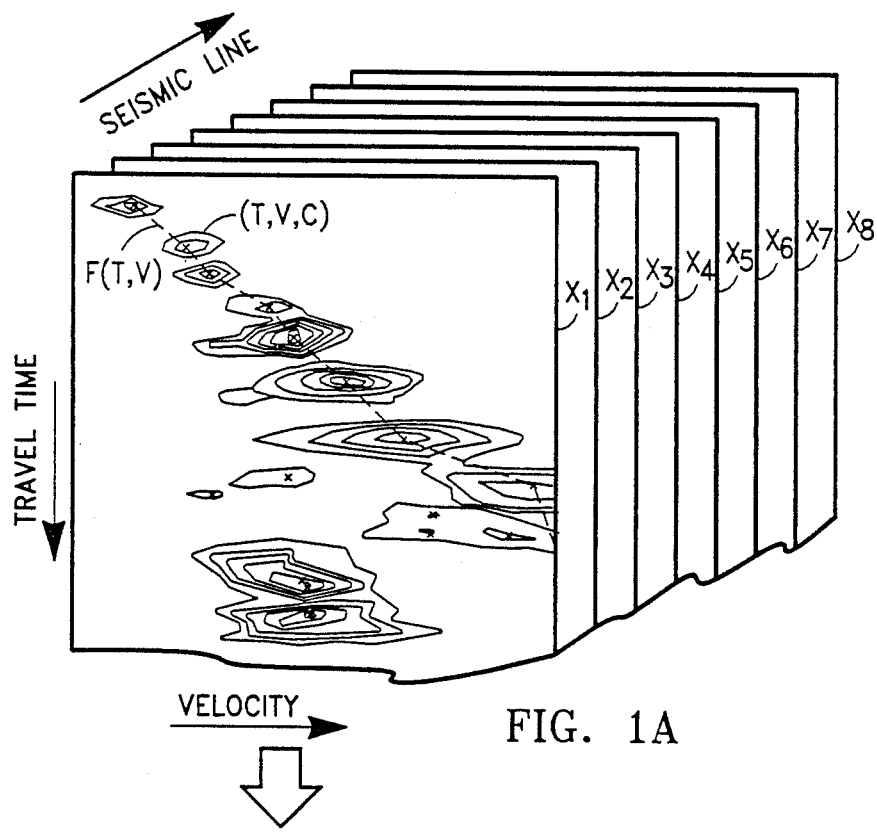
FIG. 1A illustrates velocity spectra having (T,V,C) data plotted therein at positions X along a seismic line of exploration. Coherency values C are contoured in the T-V domain.
Figure 1B:
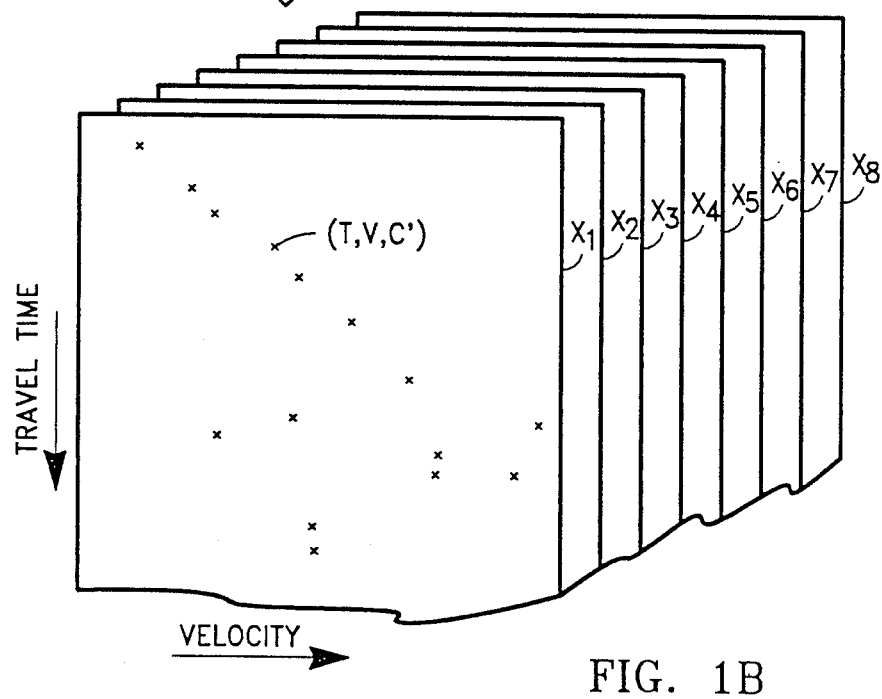
FIG. 1B illustrates that velocity spectra data (T,V,C) at positions X can be condensed to a set (T,V,C') by representing the (T,V) location of C' regional coherency peaks at positions X along a seismic line of exploration.

The step of picking regional coherency peaks (T,V,X,C') is illustrated in the drawings by the arrow connecting FIGS. 1A and 1B. It can be seen that the effect of this picking step is significantly to reduce the quantity of data for processing to a fraction as low as 1% or less of the original data set. Use of this reduced data set $\{(T,V,X,C')\}$ facilitates representing the significant information of the larger $\{(T,V,X,C)\}$ data set during processing so that it is feasible to analyze velocity spectra produced at close or even at every interval along the seismic line in accordance with the invention.

Figure 2:
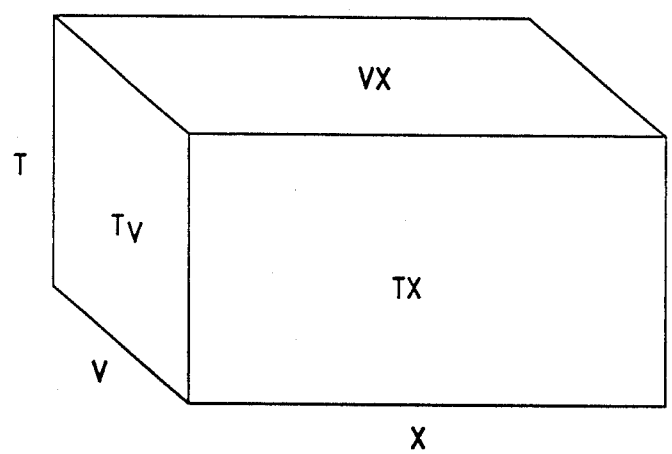
FIG. 2 illustrates T,V,X space and T-V, T-X, and V-X domains therein.

Each point in the sets $\{(T,V,X,C)\}$ and $\{(T,V,X,C')\}$ can be seen from FIGS. 1A and 1B to comprise unique locations (T,V,X) in three-space. Hence, points constituting the $\{(T,V,X,C')\}$ data set can be uniquely represented in a (T,V,X) coordinate system such as the cube illustrated in FIG. 2. By representing C' values by visual values such as assigned symbolic values, grey scale values, or color scale values representative of magnitude, coherency peaks C' can be displayed in any of the T-V, T-X, or V-X domains. Alternatively, or in addition, in any given 2-dimensional domain, the remaining nondomain variable of the T,V,X set can likewise be assigned visual values and displayed.

Referring to FIG. 1B, FIG. 1B illustrates a display in the T-V domain of (T,V) couples of a set $\{(T,V,X,C')\}$ for $X_1$ data. Similar displays of (T,X) couples and (V,X) couples in the T-X and V-X domains can similarly be produced from the {(T,V,X,C')} data. For each domain, nondomain values, for example, C' and X in the T-V domain can be represented by visual values such as symbols, grey scale and color values, so that all four parameters of the {(T,V,X,C')} data can be simultaneously viewed. In practice, as indicated, it is preferred for ease of interpretation to present only three of the values, such as (T,V,X) or (T,V,C') in the T-V domain and to present corresponding combinations in the T-X and V-X domains.

While displays in the T-V, T-X, and V-X domains can be based on a single value (or slice) of X, V, or T, generally, it is preferred that a range of values $\Delta X$, $\Delta V$, or $\Delta T$ be projected onto the T-V, T-X, V-X domains with at least one remaining nondomain value represented therein to provide an indication of variation of that value in the selected window.

Figure 3A:
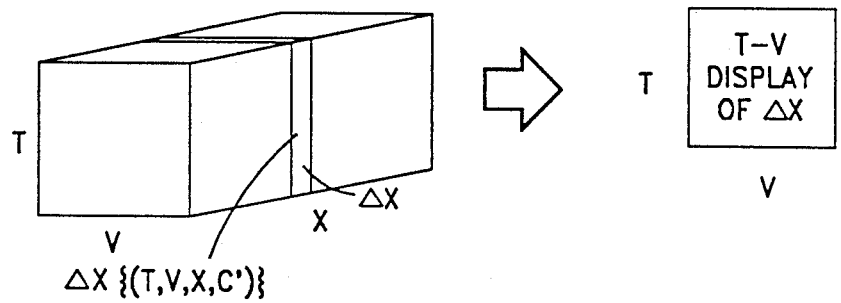
FIG. 3A illustrates that a $\Delta X$ slice or window can be selected in T,V,X space and that a window set $\Delta X$ $\{(T,V,X,C')\}$ can be projected and displayed in the T-V domain.
Figure 4A:
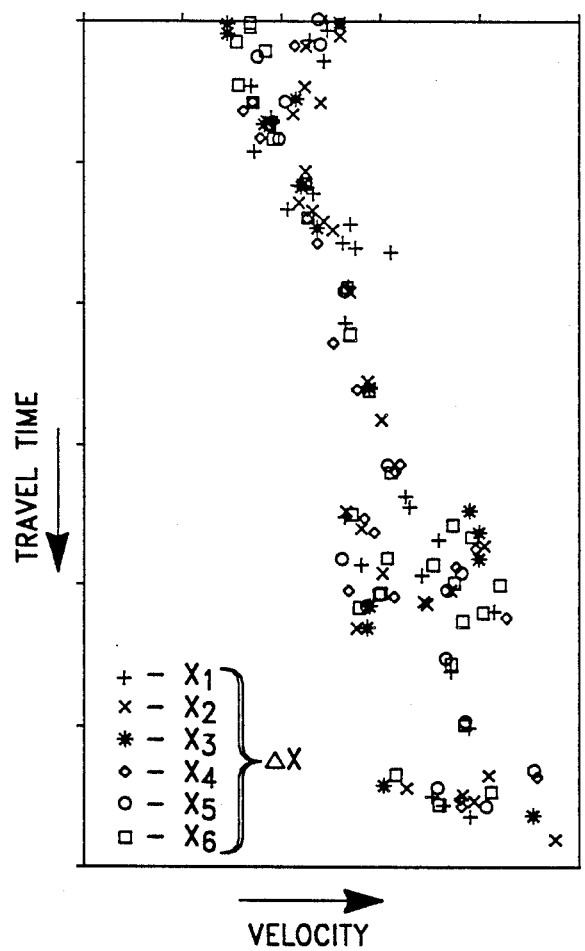
FIG. 4A illustrates a $\Delta X$ window set projected onto and displayed in a T-V domain.

Thus, referring to FIG. 3A, a window $\Delta X$ of values X selected along the X axis (a seismic line) can be projected onto, i.e., displayed in, a T-V domain display. See FIG. 4A. Such a display visually presents variations in the T-V distribution of regional coherency peaks C' as a function of position X along a seismic line and is illustrated in FIG. 4A with different positions X represented by different visual symbols. Different values X are preferably represented by color since human perception readily recognizes and interprets color representations. Such a display visually presents variations in the T-V distribution of coherency peaks as a function of position along the seismic line. By representing different values C' by color or other visual values, variation in coherency magnitude as a function of position along the seismic line can be interpreted.

It will be appreciated that projecting a range $\Delta X$ of values onto the T-V domain is as simple as selecting a subset $\Delta X$ (T,V,X,C') in a selected $\Delta X$ along the seismic line and displaying the points (T,V) of that set in the T-V domain with visual value representation of associated X, C', or both. Such can readily be accomplished by the skilled programmer or computer user.

To illustrate, in the T-V domain, by displaying coherency magnitude C', stacking velocity functions can readily be picked. Also, by displaying velocity in the T-V domain, for example, by assigning different colors to $\Delta X$ window sets along the seismic line and displaying two or more of such sets simultaneously in a T-V domain, velocity variation along the line can readily be evaluated; also, reinforcement of velocity trends can be determined. Further, by scrolling a window set along the X axis (along the seismic line) and displaying either coherency C' magnitude or velocity, the need for one or more stacking velocity functions along the seismic line can be readily evaluated.

Figure 3B:
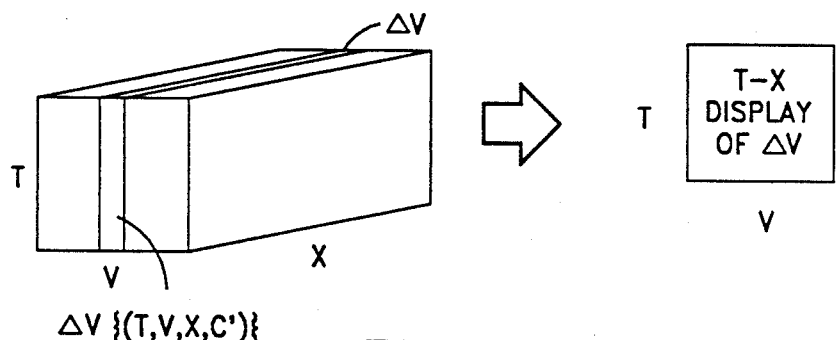
FIG. 3B illustrates that a $\Delta V$ slice or window can be selected in T,V,X space and that a window set $\Delta V$ $\{(T,V,X,C')\}$ can be projected and displayed in the T-X domain.
Figure 3C:
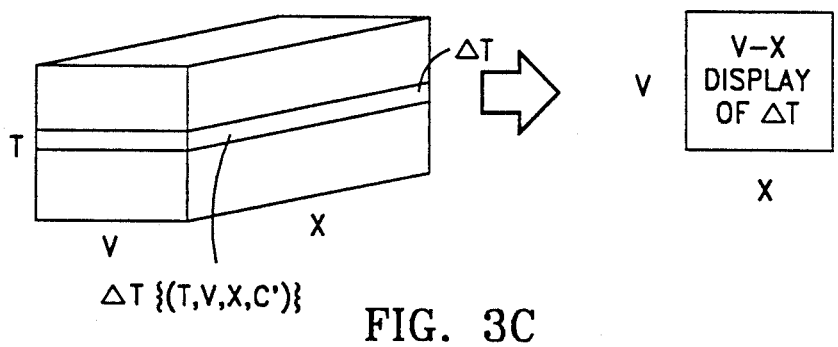
FIG. 3C illustrates that a $\Delta T$ slice or window can be selected in T,V,X space and that a window set $\Delta T$ $\{(T,V,X,C')\}$ can be projected and displayed in the V-X domain.

Referring now to FIGS. 3B and 3C, it can be seen that subsets $\Delta V$ {(T,V,X,C')} and $\Delta T$ {(T,V,X,C')} can analogously be determined and displayed in the T-X and V-X domains, respectively, with nondomain values represented by color or other visual values.

For example, in the T-X domain, by displaying either velocity or coherency by visual values, either variation in velocity along the seismic line or variation in coherency along the seismic line can be readily evaluated. By displaying both velocity and coherency, variations in both variables can be simultaneously evaluated.

To illustrate, by using color for representing variation in velocity in the T-X domain, the skilled explorationist is aided in distinguishing multiples from primary reflections. By using color to represent variation in coherency along the line, the skilled explorationist is aided in recognizing and picking specific horizons. By providing for viewing either velocity or coherency, the explorationist can thus identify a horizon in the T-X domain, and then assess the degree of velocity variation along the seismic line, thereby permitting a determination of whether one or more velocity functions should be determined for $\Delta X$ windows at intervals along the seismic line to provide an adequate stack of CMP gathers.

To further illustrate, in the V-X domain, either time or magnitude of coherency C' peaks can be displayed by visual values to permit velocity editing. As will be discussed in more detail below, visual values, such as color, can also be associated with specific horizons picked in the T-X domain so that velocity variation along the seismic line of particular horizons, and editing of horizon velocity functions for particular selected horizons, can be readily accomplished.

The range of values encompassed by a window can be determined by the user. In the T-V domain, a suitable range of X values can be two or more values of X. Preferably the range of values of X can be selected based on velocity variation along the seismic line so that a range of X characterized by similar velocities is selected. In this regard, it may be desirable to divide the X range into three windows covering the range of X and displaying the different windows by different colors to observe variation along the seismic line. In the T-X domain, $\Delta V$ is preferably selected to provide redundancy of picks (T,V,X,C') along a horizon of interest. Hence the $\Delta V$ window can comprise a third or more or even the entire range of V values to provide suitable redundancy for work on selected horizon. In the V-X domain, the $\Delta T$ window is preferably selected to encompass one or more horizons on a T-X domain display.

According to an aspect of the invention, subsets {(T,V,X,C')} of data are displayed in one or more of the T-V, T-X, and V-X domain. By using the set of regional coherency peaks {(T,V,X,C')} for such editing and displays, it is possible to greatly increase the significant data represented in such displays in accordance with the invention as compared with using {(T,V,X,C)} data. The result is that the significant horizons are represented by more than the usual number of datum points, particularly when viewed in the T-X domain.

Referring to FIG. 1A, it can be seen that the set {(T,V,X,C)} of data potentially can fill the T-V domain at positions X along the seismic line. By contrast, the set {(T,V,X,C')} as illustrated by FIG. 1B is highly sparse. Referring to FIGS. 1A and 1B, it can also be seen that T,V,C and C' are continuous variables, whereas X is a discrete variable. The data distributions of T,V,C and C' occur on discrete values of X. Consequently, the set {(T,V,X,C')} is highly sparse in T,V,X space.

Figure 4B:
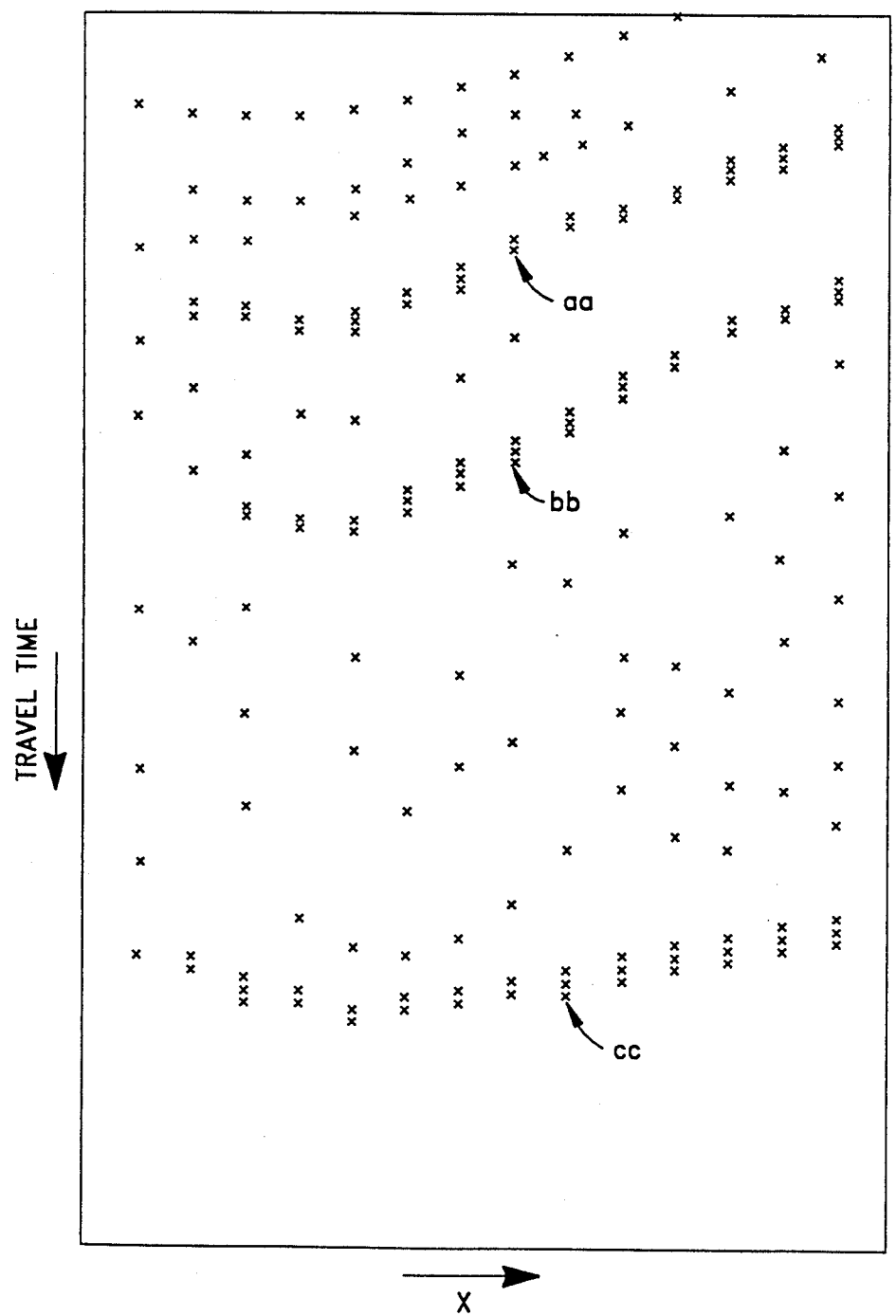
FIG. 4B illustrates a $\Delta V$ window set projected onto and displayed in a T-X domain.

Nevertheless, this highly sparse data distribution in T,V,X space when viewed in T-V, T-X or V-X domains provides a sufficient redundancy of points to be highly useful. In fact, the redundancy of data achieved by using {(T,V,X,C')} from all or substantially all CMP gathers along a seismic line is sufficient that the display of sets {(T,V,X,C')} in the T-X domain (see redundancy of (T,V,X,C') at aa, bb, cc of FIG. 4B) can even be used directly for stratigraphic interpretation. Since the usual tool for stratigraphic interpretation is the stacked seismic section of CMP gathers, this is a result not expected. Moreover, viewing of the sets {(T,V,X,C')} can therefore provide a direct indication of whether further editing of the data will be advantageous before further processing to generate stacked seismic sections, interval velocity displays, and the like. Thus, the displays of {(T,V,X,C')} data are useful in their own right for stratigraphic and processing applications as well as being useful in producing stacking velocity functions, horizon functions, and horizon velocity functions in accordance with the invention.

The advantages of displaying regional coherency picks in a selected domain can be further appreciated by considering that the result of overlaying even a few velocity spectra would be difficult to interpret; whereas, overlaying regional coherency picks can be readily evaluated and interpreted. See FIGS. 1A, 1B, 4A, and 4B.

Figure 5:
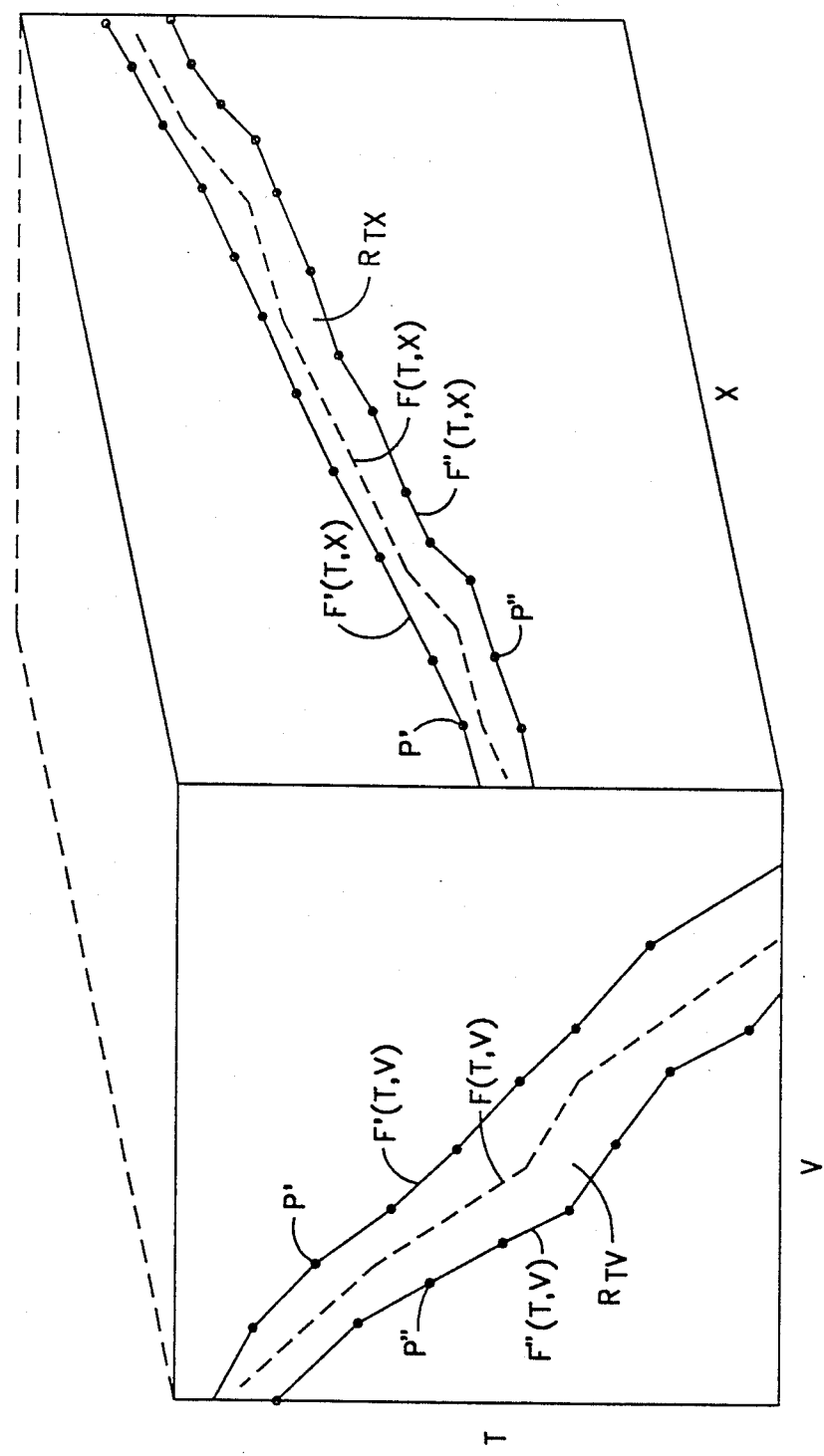
FIG. 5 illustrates fairways (relations) and functions in the T-V and T-X domains.

According to a further aspect of the invention, there is provided means and methods of selecting relations, usually referred to herein as fairways, and functions in the T-X, T-V, and V-X domains and for using the relations and functions and their unions and intersections for editing (T,V,X,C') data. The words relation and function are used in their usual sense in the mathematical and computer sciences. Thus, in reference, for example, to the T-V domain, the word relation or fairway refers to a set of {(T,V)} where neither T nor V need be uniquely determined by the corresponding value of V or T respectively. Referring to FIG. 5, a relation $R_{T,V}$ is thus defined as the set {(T,V)} points within the lines F'(T,V) and F''(T,V). It can be seen that a relation can be defined by selecting two or more series of points P' and P'' and then connecting points in respective series, for example, by interpolation to produce the F' and F'' functions.

Unlike a relation, a function such as F(T,V) illustrated by the dashed line in the T-V domain, is a rule between sets T and V which assigns to each member of T exactly one value of V and conversely visa-versa. It will be seen that the set of points $R_{T,V}$ includes the set determined by F(T,V). It will also be appreciated that whereas the relation $R_{T,V}$ includes (T,V,X,C') within the boundaries defined by F' and F'', the function F(T,V) may or may not correspond to particular values of (T,V) in the {(T,V,X,C')} data set.

Relations and functions can analogously be defined and selected in the T-X and V-X domains. Thus, FIG. 5 shows a relation $R_{T,X}$ defined by lines F'(T,X) and F''(T,X) and a function F(T,X). Relations $R_{V,X}$ and functions F(V,X) can likewise be defined and selected in the V-X domain as illustrated in FIG. 9.

It will be noted that by defining a relation R, which is a subset of a selected domain, a set of points (T,V,X,C') is included in the relation and a set of points (T,V,X,C') projected on the domain is included in the relation and another set of points (T,V,X,C') projected on the domain is excluded. Thus, in FIG. 5, $R_{T,V}$ includes (T,V) points between F' and F''. It will be appreciated that thus the selection of the functions F' and F'' can be used to accomplish an editing of the (T,V,X,C') data set in a particular domain.

Relations and functions can be readily selected and defined on a computer monitor on which the (T,V,X,C') data set is displayed by using a mouse or other means (discussed in more detail below in reference to FIG. 10) for defining points P' and P'', and programming the computer to connect the points P' and P'' by linear or spline or preselected function curve-fitting to produce F' and F'' functions and then to exclude data of the {(T,V,X,C')} set displayed on the domain which fall outside the defined relation or function in the selected domain.

Figure 6:
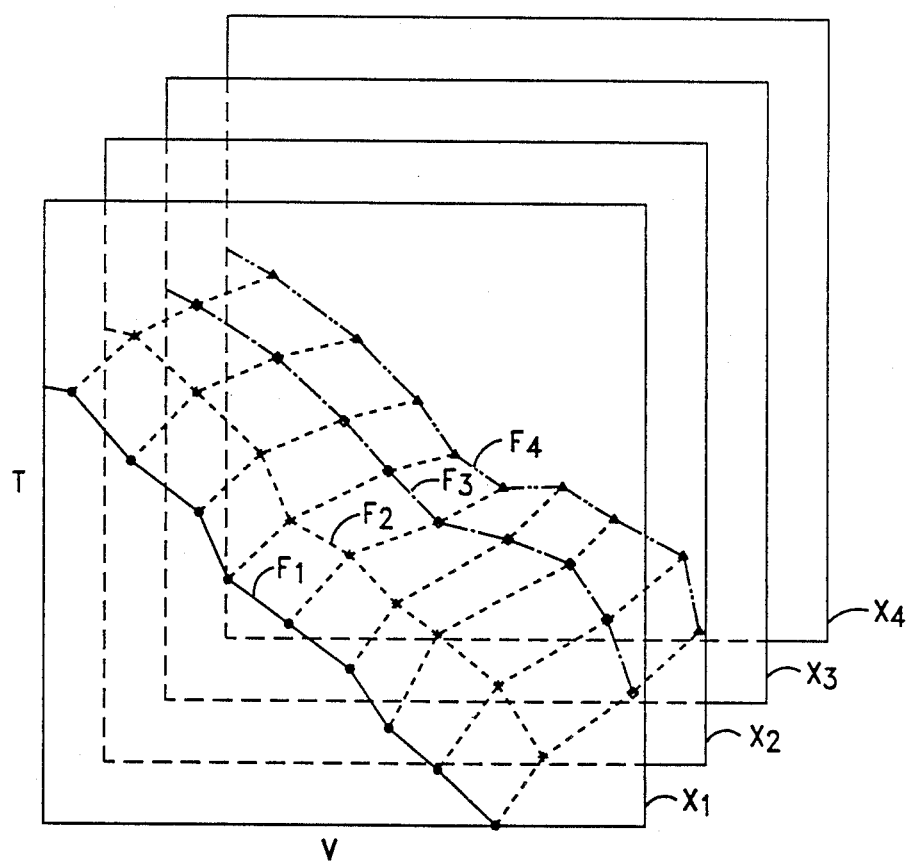
FIG. 6 illustrates that two-space functions selected in spaced apart two-space domains can be used to generate a three-space function.

Referring now to FIG. 6, FIG. 6 illustrates that functions $F_1$, $F_2$, $F_3$, $F_4$ . . . defined, for example, in T-V domains positioned at $X_1$, $X_2$, $X_3$, $X_4$ . . . can be connected as shown by dashed lines to form a function (surface) F(T,V,X) in (T,V,X) space. Likewise, relations defined by F' and F'' in more than one T-V domain along the seismic line can be interconnected, for example, by interpolation, curve fitting, or other function, to define a three-dimensional relation or fairway in (T,V,X) space.

It will be apparent that different (T,V,X) relations can be defined by selecting relations in any of the T-V, T-X, and V-X domains, optionally at different windows located at different positions along a variable, and interconnecting them in (T,V,X) space. Relations defined in T,V,X space by interconnecting relations respectively defined in the T-V, T-X, and V-X domains will be respectively referred to herein as relations $R_{T,V}(T,V,X)$, $R_{T,X}(T,V,X)$, and $R_{V,X}(T,V,X)$.

Figure 7A:
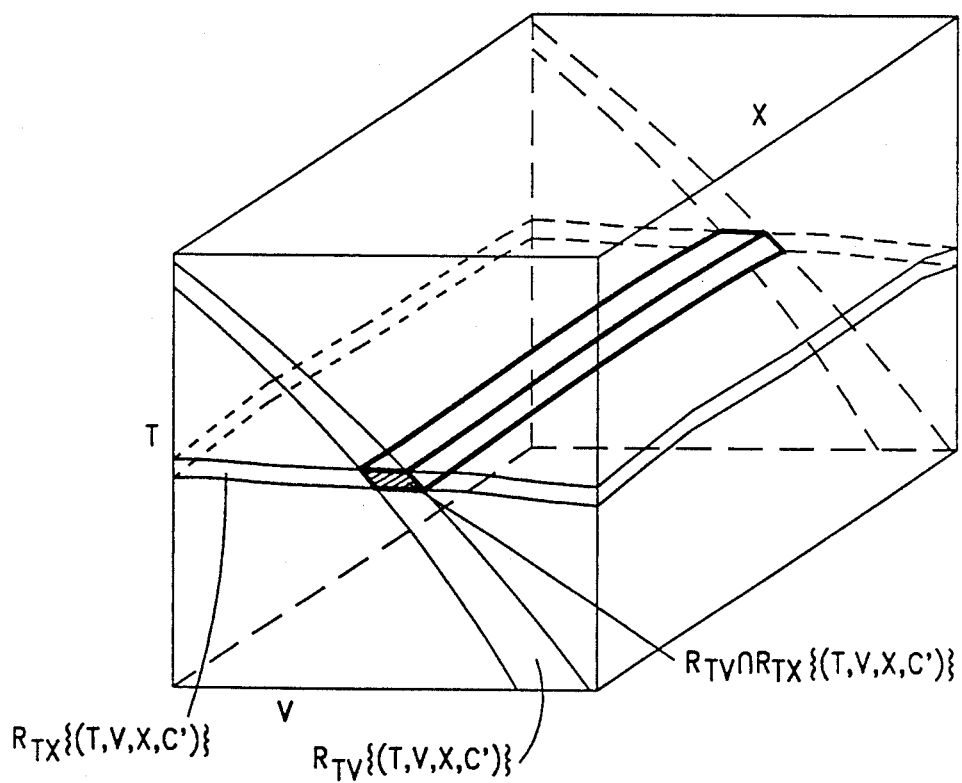
FIGS. 7A and 7B illustrate union and intersection sets of T-V and T-X fairways (relations) respectively.
Figure 7B:
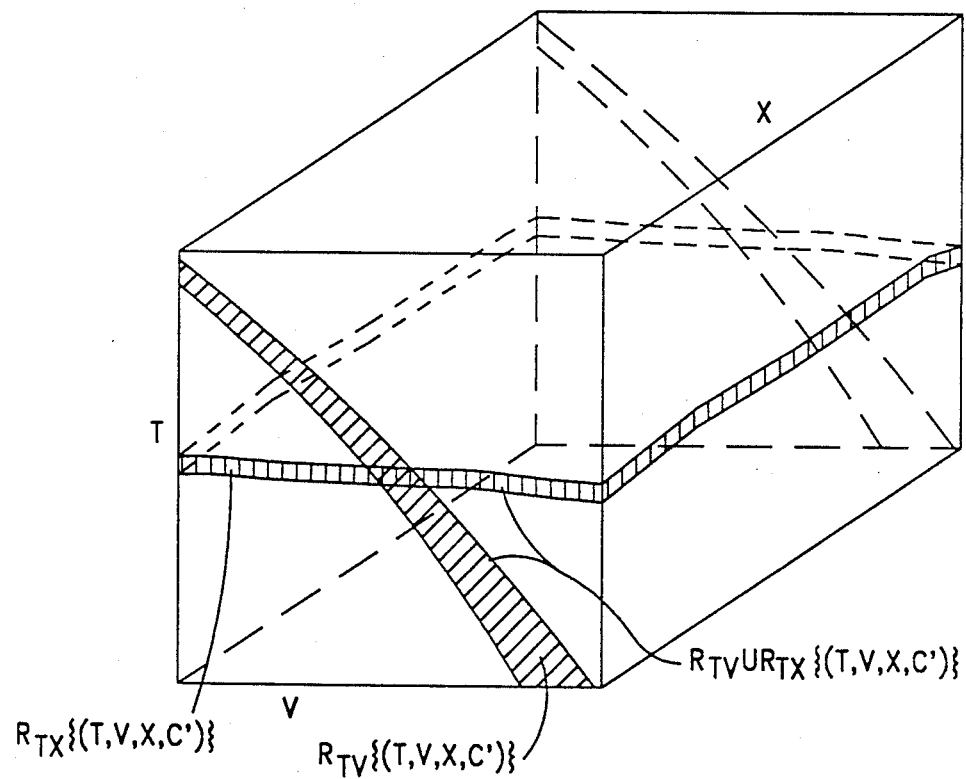

Referring now to FIG. 7A, FIG. 7A illustrates that a relation $R_{T,V}(T,V,X)$ intersects a relation $R_{T,X}(T,V,X)$ in T,V,X space and illustrates the union of the two sets $R_{T,X}(T,V,X) \cap R_{T,V}(T,V,X)$ by cross-hatching. Thus, the unions of various relations and functions can be used for further editing of {(T,V,X,C')} in accordance with the invention. Alternatively, referring now to FIG. 7B, the intersection of various relations and functions can be used to add previously-deleted points {(T,V,X,C')} of interest to a set under consideration. For example, after selection of relation $R_{T,V}$ in the T-V domain and editing of the (T,V,X,C) data set, it may be desirable to select functions $R_{T,X}$ in the T-X domain and to intersect such sets to expand the data set under consideration for determination of velocity functions along the seismic line. Analogously, in determining horizon velocity functions, it may be desirable to determine relations $R_{T,X}$ and $R_{V,X}$ and to intersect such relations to produce an expanded data set for further evaluation and editing for the determination of horizon velocities along the seismic line. Other combinations of relations, intersections, and unions of the (T,V,X,C') data can also be generated and used.

According to a further aspect of the invention, there is provided means for horizon velocity editing comprising means for determining horizon velocity functions in the T-X domain and for displaying thus determined horizon velocity functions in the V-X domain for editing.

Figure 8A:
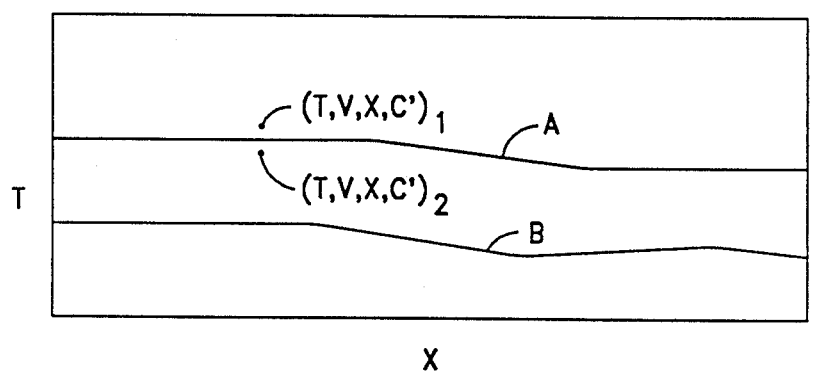
FIG. 8A illustrates that velocity values of (T,V,X,C') data adjacent to a selected horizon can be associated with the horizon using a T-X display to produce a horizon velocity function.

Referring now to FIG. 8A, there is illustrated schematically two horizons A,B in the T-X domain. The horizons can be determined by selecting in accordance with the invention T-X horizon fairways or preferably T-X horizon functions in the T-X domain. Velocities adjacent the horizon, for example, a velocity such as characterizes points $(T,V,X,C')_1$ and $(T,V,X,C')_2$ FIG. 8A, can then be associated with for example horizon A, for example, by (1) interpolation of velocity values to the horizon times, (2) interpolation of velocity values within a time window selected adjacent the horizon to the horizon times, or (3) associating the velocity values of (T,V,X,C') having T values nearest to the horizon times with the horizon time. It will be appreciated that this third approach maintains the original coherency values which may be desirable in horizon velocity editing because the (time, velocity) values are still the same and have not been interpolated. It will be recalled that whereas relations comprise sets of {(T,V,X,C')} of regional coherency picks, velocity functions and horizon functions are selected by the user based on (T,V,X,C') picks but do not necessarily, although they frequently do, include any picks. Hence, it is often necessary or at least desirable to associate velocity values of (T,V,X,C') picks adjacent a selected horizon function with the horizon function, or analogously in the other domains, to associate selected values of adjacent coherency picks (T,V,X,C') with the selected functions. The result of associating velocity values with a horizon function F(T,X) is a horizon velocity function F(T,V,X).

Figure 8B:
FIG. 8B illustrates displays of horizon velocity fairways and horizon velocity functions in a V-X domain.
Figure 8B:
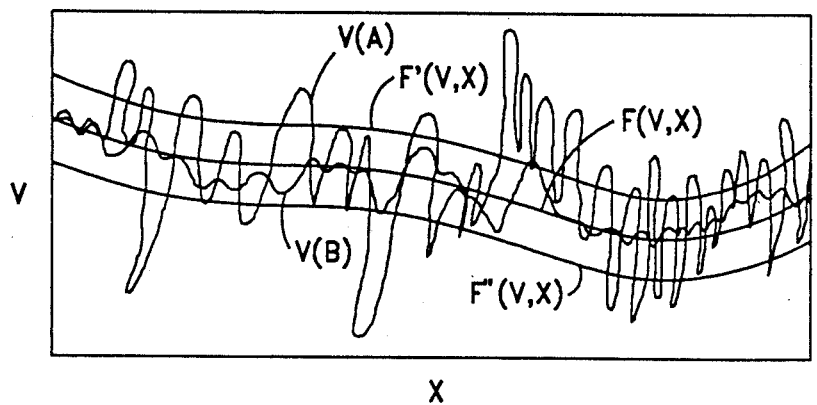

After velocity values have been associated with selected horizons in the T-X domain to produce horizon velocity functions, means are provided for editing the horizon velocity functions in the V-X domain by displaying variation in velocity as a function of position along the seismic line. Such a V-X domain display is illustrated in FIG. 8B showing velocity variations V(A) for the horizon velocity function of horizon A and velocity variations V(B) for the horizon velocity function of horizon B. Visual values such as color may be associated with different horizons to facilitate interpretation and use. Horizon velocity functions V(X) may be displayed selectively, in sets, or comprehensively as selected by the user.

The V-X domain display also provides for viewing (T,V,X,C') picks as a function of V or X along the seismic line. The data may be displayed with color controlled by time, coherency, or horizon number.

It can be seen that velocity can vary significantly along a seismic horizon and that editing of the (T,V,X,C') picks used for associating velocity with the horizon may be desirable. FIG. 8B illustrates this in the V-X domain display V,X functions which can be selected therein. Thus, relations $R_{V-X}$ (T,V,X) can be defined by F' and F'' analogously as previously discussed for other domain displays. The edited data can then be unioned or intersected with other selected relations or functions of data and can be displayed in the T-X and/or T-V domains for further editing, horizon velocity calculation, and the like until a final horizon velocity function F(V,X) is satisfactory to the user. Alternatively, various smoothing functions can be applied to the display of F(V,X) from a preselected library of smoothing functions or preferably, a smoothed function can be generated by the user by picking by operations functionally related to the display using keyboard or mouse.

By associating different colors with different horizons and displaying selected horizons on the V-X domain display, horizon velocity editing can be performed for single horizons, sets of horizons, or for all horizons simultaneously, depending on differences in velocity variation from horizon to horizon and on the user's needs. Thus, FIG. 8B illustrates such editing for two horizons A and B. Of course, horizon velocity functions can also be displayed in the V-X domain with coherency or time being assigned visual values for review and editing.

According to a further aspect of the invention, sets {(T,V,X,C')} produced according to the invention can be used as a set operated on according to the invention. For example, a union set or version can be saved and later intersected with another union set to produce an enlarged union set. Likewise, a fairway set or function can be saved and later unioned or intersected with another fairway set or function and the like.

Further according to the invention, fairways or functions produced in accordance with the invention can be displayed and viewed in displays of other sets {(T,V,X,C')} produced using the invention.

Figures 9A, 9B:
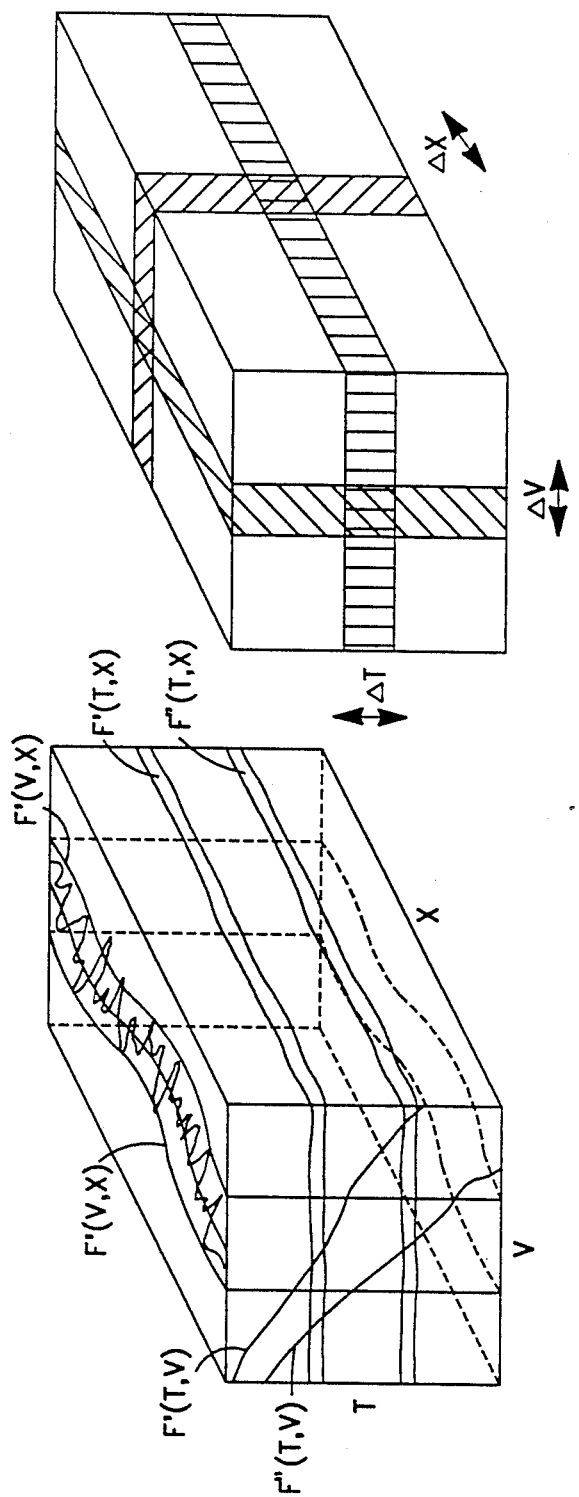
FIG. 9A illustrates intersection and union sets of T-V, T-X, and V-X fairways in T,V,X space.
FIG. 9B illustrates intersection and union sets of selectable, positionable $\Delta V$, $\Delta T$, and $\Delta X$ windows or slices in T,V,X space.

Referring now to FIGS. 9A and 9B, these figures illustrate that intersection and union sets of selectable fairways, relations and functions (see FIG. 9A) and of selectable positionable windows Δ (FIG. 9B) can be used to edit a set of {(T,V,X,C')} of data in T,V,X space. As indicated above, windows Δ can be used to generate displays in which such fairways, relations, and functions are defined by the user, preferably directly from the display using keyboard, mouse, or the like. Then, the fairway's relations and functions can be used for editing of the {(T,V,X,C')} data set.

From FIGS. 9A and 9B, it will thus be seen that the apparatus and the method in accordance with the invention can be used as a lattice filter for using intersecting windows, relations and functions for selecting subsets of {(T,V,X,C')}.

According to a further aspect of the invention, stacking velocity functions or data, horizon velocity functions or data, and horizon velocity functions or data from other windows or from versions (subsets of {(T,V,X,C')} made using the invention) or from other sources of seismic exploration can be displayed in a selected domain and used for evaluation and editing of displays in accordance with the invention.

Thus, a stacking velocity function F(T,V) from other seismic exploration in the area of interest can be provided and displayed in the T-V domain (see FIG. 5) for evaluation, and further editing as desired, or fairways and functions selected in the T-V domain using the invention.

In like manner, a horizon function, or horizon data {(t,x)} from a stacked seismic section can be provided and displayed in the T-X domain (see FIG. 5) for evaluation and editing of fairways and functions selected in the T-X domain using the invention.

In like manner, horizon velocity functions F(T,V,X) or data from other seismic exploration can be provided and displayed in the V-X domain (see FIG. 8B) for evaluation and editing of functions and fairways selected in the V-X domain using the invention.

In like manner, velocity values determined from other seismic exploration can be provided and displayed in the T-V and V-X domains. Preferably, RMS (root mean square) velocity values are so provided and used since RMS velocity most nearly approximates stacking velocity.

According to a further aspect of the invention, fairways and functions selected in a window Δ can preferably be displayed in other window sets Δ for assisting in evaluation and editing of other window sets using the invention. Thus, a stacking velocity function determined for a window ΔX at a first position X along the seismic line can be saved and displayed in a display of window ΔX at another position X along the seismic line to assist in editing and selection of fairways and function for that position.

The invention can be further understood and appreciated by discussing methods of using the various domain displays and methods using such displays.

Thus, the T-V domain display offers display of a set of velocity picks {(T,V,X,C')} with color controlled by coherence or relative position within a selected slice ΔX of record numbers or shot points. As indicated, it may be desirable to overlay well data having velocity values converted for example to RMS velocities selectively on a T-V domain for evaluation and editing and to store and retrieve previously picked relations (i.e., velocity fairways). Simple velocity functions may also be stored, retrieved from a database, and displayed for comparison with other selections made in accordance with the invention.

The T-X domain display provides for viewing a set of velocity picks $\{(T,V,X,C)\}$ as a function of time and record number or shot point along the seismic line. Colors can be displayed for velocity or coherency values of the picks $(T,V,X,C)$. Using the T-X domain display, horizons may be picked, stored, and/or retrieved from a database and selectively displayed for evaluation and editing of horizon functions generated using the invention. Horizon velocity functions may be generated, for example, using one of the three modes described above, for associating velocity values V with a selected horizon $F(T,X)$ to produce the horizon velocity function $F(T,V,X)$. Horizons previously picked, for example, from stacked seismic sections of CMP gathers may be read in from a database and compared with velocity picked sets $\{(T,V,X,C')\}$ on T-X domain displays. Fairways created in the T-V domain may be advantageously copied to other spatial locations X along the seismic line. Fairway editing can be accomplished for example by interpolation of fairways between locations where fairways have been defined in accordance with the invention, and exclusion of $\{(T,V,X,C')\}$ data falling outside such fairways. As is known to those skilled in geophysical interpretation, it is often important to locate fairways on both sides of an irregular feature rather than in the middle to ensure control of the fairway editing process.

Horizon velocity functions may be edited in the V-X plane as a means of smoothing data and removing unwanted noise or variation in velocity variation along the seismic line. Edited horizon velocity functions may be advantageously used to replace the original calculated horizon velocity functions in the V-X domain. In this way, some or all of the original calculated horizon velocity functions may be replaced by user-picked functions in the V-X domain. Smoothing of the velocity function may be accomplished by the user, for example, using a mouse, as previously described, or a smoothing operator such as is known to those skilled in the art can be applied to horizon velocities in a particular selected set of horizons.

Figure 10:
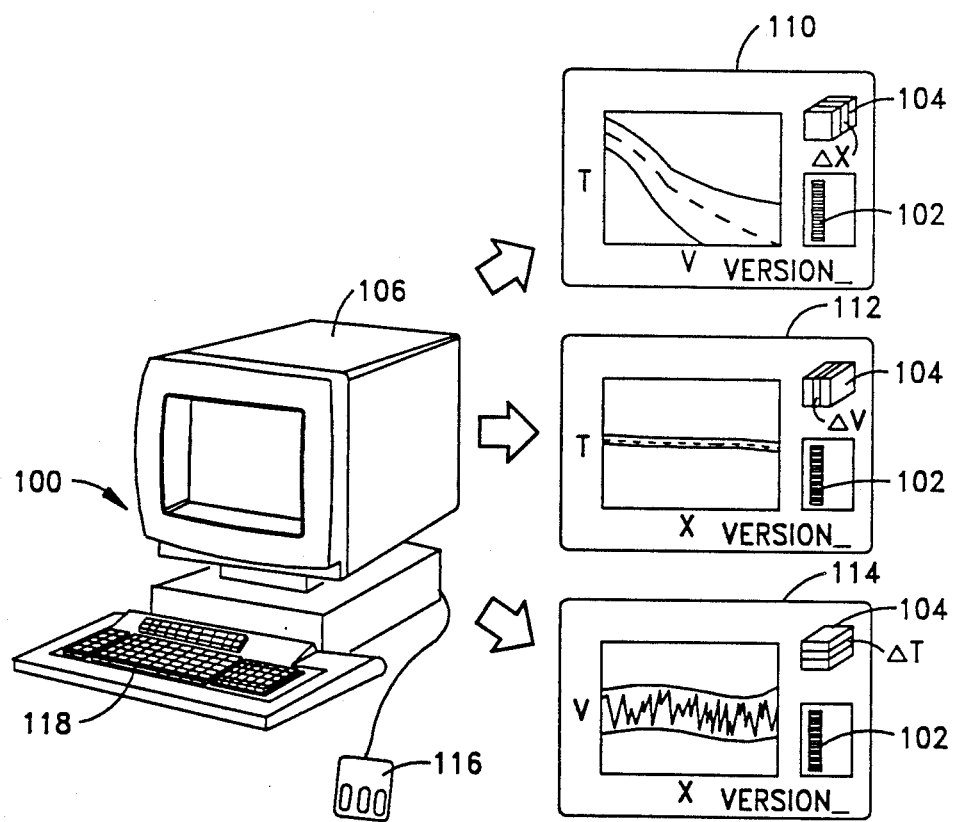
FIG. 10 illustrates preferred apparatus and illustrative displays in accordance with the invention.

FIG. 10 illustrates apparatus 100 for geophysical exploration in accordance with the invention comprising means for generating displays such as monitor 108 in the T-X, T-V, and V-X domains (see displays 110, 112, and 114, respectively) and means for defining fairways and functions operationally connected with such domain displays such as mouse 116 or keyboard 118. From the discussion herein, it will be apparent that the invention can readily be implemented by a skilled applications programmer in the geophysical arts. This is because the basic data set $\{(T,V,X,C')\}$ comprises a set of points in four space. Consequently, selecting windows, such as $\Delta X$, $\Delta T$, $\Delta V$ windows, of such data and projecting $\Delta \{(T,V,X,C')\}$ window set data onto T-V, T-X, and V-X domains is as straightforward as displaying domain values of the $\{(T,V,X,C')\}$ points of the selected window in the selected domain. Associating color or other visual values with selected points or sets of points or with selected variables, selecting fairways or relations or functions in the various domains, using for example a keyboard or a mouse operationally connected with the display, and other programming necessary to implement the invention from the description herein can readily be accomplished by a skilled applications programmer.

As illustrated in displays 110, 112, 114 of FIG. 10, it may also be desirable or advantageous to display T,V,X cube cartoons 104 showing positioning of $\Delta X$, $\Delta T$, $\Delta V$ windows, color values assigned (see color spectra 102) to selected variables, and identifiers (such as version numbers for the sets $\{(T,V,X,C')\}$ of data being viewed, and the like.

According to various aspects of the invention, means functionally related to a display is used for delimiting functions, relations, fairways, and the like. This means can be any means which can select points in a coordinate system of the display and input such points to a data processor for generation of functions, fairways, and relation and the like in accordance with the invention. Such means can include a keyboard where coordinates can be directly input from the keyboard controlling a cursor on the display thus including keyboard means for inputting selected points on the display, means positionally related to a coordinate system of the display such as a mouse, trackball, or joystick, means mapping a coordinate system for selection of points thereon corresponding to the points on a coordinate system of a display such as a digitizing tablet, and means such as light pens, touch sensitive screens and the like. Once a set of points is defined by such means, a programmed data processor can generate a function including such points by, for example, linear interpolation between the points, curve fitting, and the like, all of which can be readily accomplished by the skilled programmer from the descriptions herein.

Some examples for typical use of the invention are discussed below. Thus, the apparatus in accordance with the invention can be used for obtaining stacking velocity functions quickly for producing brute stacks of seismic data or iteratively for producing higher resolution stacks. Thus, the $\{(T,V,X,C')\}$ data can be displayed in the T-X domain and the user can note event alignments, including noting multiples having low velocity colors at depth in the midst of higher velocity peaks. The user can also look at the structure across the line to see if much lateral velocity variation should be expected. The user can then select a flat reflector in a good signal-to-noise area and select a $\Delta X$ in that region and return to the T-V domain display for viewing the $\Delta X$ $\{(T,V,C')\}$ data. There, if the user can see a clear trend of primaries, the user can pick a velocity function at other positions X along the seismic line until the user is satisfied that enough functions have been selected to cover the variability of the $(T,V,X,C')$ data along the seismic line. The velocity function can then be interpolated between the selected values and the selected velocity function can be output for use in stacking the seismic data and producing a stacked seismic section.

The invention can also be used for producing horizon velocity functions. This aspect is illustrated by the following. Thus, as indicated, a set of time horizon values for which there are numerous trial stacking velocities and associated coherency values can be viewed in T-X domains and horizon functions selected. Then horizon velocities can be calculated in the T-X domain, for example, using mode (3) described above which preserves the original data coherency values and the resulting velocity values can be associated with the horizon functions to produce horizon velocity functions. The horizon functions with associated velocity values may then be displayed in the V-X domain by controlling the location of the ΔT window in the T,V,X cube to include the selected horizon and by coloring the horizon by time or coherence. Either specific horizons or sets of horizons can be displayed to obtain a discrete horizon velocity function for each location X (CMP record) along that horizon. The resulting horizon velocity functions may then be used, for example, for generating displays of velocity as a function of horizon.

According to a further aspect, the apparatus in accordance with the invention can be used for generating a velocity depth model. Thus, {(T,V,X,C')} data can be displayed in the T-V domain and the user can determine whether trends exist. The data can then be displayed in the T-X domain and structure can be evaluated. The user can then interpret and pick velocity functions across the seismic line in the T-V plane, overlaying as desired adjacent picked velocity functions. The user can then interpret and pick velocity functions to view trends across the line. Once velocity functions are satisfactory to the user, fairways can be picked based on the velocity functions. If ray trace-based event migration is planned, broad fairways will retain variations in stacking velocities due to shallow velocity anomalies. If Dix interval velocity inversion is planned, narrow fairways help constrain wide swings in interval velocities. The data can then be fairway-edited in the T-X domains by excluding {(T,V,X,C')} outside the selected fairway and the resulting edited set {(T,V,X,C')} viewed in the T-X domain, horizons being picked as desired, or horizons can be input from another database. If seismic horizon velocities are desired, horizons can be picked along the seismic reflectors seen in the T-X domain. The horizon velocities can then be calculated using the method of choice and associated with the horizons to produce horizon velocity functions. The resulting horizon velocity functions can then be viewed in the V-X domain and a smoothed horizon velocity function can be selected and saved and used for generating velocity depth models such as are known to those skilled in the art.

Further advantages and benefits of the invention will be apparent to those skilled in the art from the description herein. However, it will be appreciated that the apparatus and method provide the following advantages: (1) an ability to handle more significant data than many conventional methods, (2) greater accuracy due to the display of more significant data, (3) greater facility in interpreting velocity data because views of the data can be changed rapidly at the user's discretion, and (4) the additional benefit of horizon-oriented velocity analysis which applies another dimension of constraint on velocity analysis not easily employed by methods previously.

Many other methods, uses, and advantages in accordance with the invention will be apparent to those skilled in the art from the description herein. The invention is accordingly not limited to the specific embodiments and methods described herein but by the claims appended hereto interpreted in accordance with law.

What is claimed is:

1. Apparatus for geophysical exploration comprising:
   projecting and displaying means for projecting onto and displaying in a single plane in at least the T-V domain, and optionally in the T-X and V-X domains a set -(T,V,X,C')- of velocity spectra local coherency maxima points (T,V,X,C') from a plurality of velocity spectra in T-V domains at a plurality of positions X along a seismic line of exploration, each (T,V,X,C') point representing travel time T and velocity V location of a regional coherency maximum C' on one of the plurality of velocity spectra in a T-V domain at a position X along the seismic line of exploration;
   third variable visual value means for assigning different visual values to different values of X being displayed in the T-V domain; and
   function defining means for inputting selected points in the displayed domain by operations functionally connected to the displayed domain and for mathematically relating the selected points and defining a function between the variables of the displayed domain.

2. The apparatus of claim 1 further comprising editing means for generating the set -(T,V,X,C')-, the editing means comprising:
   window means for determining at least one window Δ in a range selected from X,V,T for T-V, T-X, and V-X domains respectively and for producing a selected window set Δ -(T,V,X,C')- of a set -(T,V,X,C')-.

3. The apparatus of claim 2
   wherein window means comprises means for determining a window ΔX in the X range for the T-V domain and for producing a selected window set ΔX -(T,V,X,C')-.

4. The apparatus of claim 1 further comprising editing means for generating the set -(T,V,X,C')-, the editing means comprising:
   fairway defining means for defining at least one of fairways $R_{TV}$, $R_{TX}$, $R_{VX}$ for T-V, T-X and V-X domains respectively for producing selected fairways sets R -(T,V,X,C')- of a set -(T,V,X,C')-.

5. The apparatus of claim 4 further comprising editing means for generating the set -(T,V,X,C')-, the editing means comprising:
   fairway defining means for defining at least a fairway $R_{TV}$ in the T-V domain and for defining a fairway $R_{TX}$ in the T-X domain for producing an $R_{TV}$ fairway set -(T,V,X,C')- and an $R_{TX}$ fairway set -(T,V,X,C')-;
   union means for producing a union set of the $R_{TV}$ fairway set and the $R_{TX}$ fairway set.

6. The apparatus of claim 5 wherein the fairway defining means comprises:
   window means for determining ΔX windows at two positions X along the seismic line and for producing at least two ΔX window sets;
   $R_{TV}$ fairway defining means for defining $R_{TV}$ fairways in projected displays of each of the ΔX window sets and for interconnecting thus defined $R_{TV}$ fairways and for producing an $R_{TV}$(T,V,X) fairway set in T,V,X space;
   $R_{TX}$ fairway defining means for defining and producing an $R_{TX}$(T,V,X) fairway set in T,V,X space; and
   wherein union means comprises means for producing a union set of the $R_{TV}$(T,V,X) fairway set and the $R_{TX}$(T,V,X) fairway set.

7. The apparatus of claim 1 further comprising:
   third variable visual value means further comprises means for assigning visual values to a third variable for representing the third variable in a selected two-variable domain selected from T-X and V-X domains wherein first and second variables are variables in the selected two variable domain.

8. The apparatus of claim 7 further comprising:
third variable visual value means for assigning visual values to coherency peaks C' magnitude for displaying in the T-V domain, T and V being first and second variables, and for assigning visual values to a selected one of coherency peaks C' magnitude and stacking velocity V for displaying the selected one in the T-X domain.

9. The apparatus of claim 2 further comprising:
range setting means for determining the range of a selected window $\Delta$; and
position setting means functionally related to displays in at least of the T-V, T-X, and V-X domains for setting the position of a corresponding window $\Delta$ at a particular value of the window variable.

10. The apparatus of claim 5 wherein the fairway defining means for defining a fairway $R_{TX}$ in a T-X domain comprises function defining means for defining a horizon function F(T,X) in the T-X domain.

11. The apparatus of claim 1
wherein the projecting and displaying means comprises means for projecting and displaying a set of -(T,V,X,C')- in a T-X domain; and wherein
function defining means comprises means for defining a horizon function in the displayed T-X domain; and further comprising
third variable visual value means for assigning visual values to coherency peak C' magnitude for displaying coherency magnitudes in the T-X domain, T and X being first and second variables; and
velocity value associating means for associating velocity values of adjacent -(T,V,X,C')- with the defined horizon function in the T-X domain.

12. The apparatus of claim 11
wherein projecting and displaying means comprises means for displaying a defined horizon function having associated velocity values in a V-X domain; and
wherein function defining means comprises means for defining a horizon velocity function in the V-X domain.

13. The apparatus of claim 12 further comprising:
horizon visual value means for associating visual values with a defined horizon function.

14. The apparatus of claim 1 further comprising editing means for generating the set -(T,V,X,C')-, the editing means comprising:
window means for determining at least one window $\Delta$ in a range selected from X,V,T for T-V, T-X and V-X domains respectively and for producing a selected window set $\Delta$ -(T,V,X,C')- of a set -(T,V,X,C')-;
fairway defining means for defining at least one of fairways $R_{TV}$, $R_{TX}$, $R_{VX}$ for T-V, T-X and V-X domains, respectively for producing a selected fairway set R -(T,V,X,C')- in a selected domain; and
wherein the projecting and displaying means comprises means for selecting and displaying in selected domains selected ones of the selected window set $\Delta$ and the selected fairway sets R.

15. The apparatus of claim 14 wherein the editing means further comprises adding/deleting means for producing a selected set $\{(T,V,X,C')\}$ by one of unioning and intersecting sets produced by at least one of window means and fairway defining means;
wherein the displaying and projecting means comprises means for projecting and displaying resulting unioned/intersected set in a selected domain.

16. The apparatus of claim 4:
wherein window means comprises means for determining a $\Delta X$ window in an T-X domain and for producing a window set $\Delta X\ \{(T,V,X,C')\}$;
wherein fairway defining means comprises means for defining at least $R_{TV}$ fairway in a T-V domain and for producing a $R_{TV}$ fairway set $R_{TV}\{(T,V,X,C')\}$;
wherein editing means comprises means for producing a selected set $\{(T,V,X,C')\}$ by unioning $\Delta X\ \{(T,V,X,C')\}$ and $R_{TV}\{(T,V,X,C')\}$; and
wherein function defining means comprises means for defining an F(T,V) function.

17. The apparatus of claim 4 wherein the window means comprises means for operating on any displayed and projected set of $\{(T,V,X,C')\}$; and wherein:
the fairway defining means comprises means for operating on any selected set of $\{(T,V,X,C')\}$; and wherein
the editing means comprises means for operating on any projected and displayed set of $\{(T,V,X,C')\}$.

18. The apparatus of claim 2 wherein:
the window means comprises means for determining at least one window $\Delta X$ at a selected position along the seismic line for producing a selected $\Delta X$ window set; and wherein:
the projecting and display means comprises means for projecting and displaying the selected $\Delta X$ window set in the T-V domain; and wherein:
the fairway defining means comprises means for defining a relation set $R_{TV}$ of the projected and displayed selected $\Delta V$ window set; and wherein:
the function defining means comprises means for defining a function F(T,V) from a projected and displayed T-V domain of one of the union and intersection of the $\Delta X$ window set and the $R_{TX}$ relation set.

19. The apparatus for geophysical exploration according to claim 1 wherein:
the function defining means for defining a function comprises means for selecting points in a coordinate system of the display and for inputting such points to a data processor for generation of functions and for generating functions from thus input data.

20. The apparatus according to claim 19 wherein:
the means for selecting points in a coordinate system of the display and for inputting such points to a data processor for generation of functions comprises means positionally related to display coordinates.

21. The apparatus of claim 1 for geophysical exploration further comprising:
projecting and displaying means for projecting onto and displaying in a single plane in at least the T-X and V-X domains a set of -(T,V,X,C')- velocity spectra local coherency maxima points (T,V,X,C') from a plurality of velocity spectra in T-V domains at a plurality of positions X along a seismic line of exploration, each (T,V,X,C') point representing travel time T and velocity V location of a regional coherency maximum C' on one of the plurality of velocity spectra in a T-V domain at a position C along the seismic line of exploration; and function defining means for inputting selected points in the displayed T-X domain and for mathematically relating the selected points and defining a function F(T,X) between the variables of the displayed domain;

velocity value associating means for associating velocities of -(T,V,X,C')- adjacent the thus defined horizon with the thus defined horizon function and generating a horizon-velocity function F(T,V,X) and for displaying the resulting horizon velocity function in the V-X domain, said means for associating velocities with the horizon function being effective for one of (1) associating velocity values obtained by interpolating to the horizon function F(T,X) velocity values of (T,V,X,C') points having T values adjacent the horizon function F(T,X), (2) associating velocity values obtained by interpolating to the horizon velocity function F(T,X) velocity values of (T,V,X,C') points having T values within a selected range of T values adjacent to the horizon function and F(T,X) and (3) associating velocity values of (T,V,X,C') points having T values adjacent the horizon function with the horizon function F(T,X) thus forming the horizon velocity function F(T,V,X).

22. The apparatus of claim 1 for geophysical exploration further comprising:

projecting onto and displaying in a single plane in the T-X domain a set of -(T,V,X,C')- velocity spectra local coherency maxima points (T,V,X,C') from a plurality of velocity spectra in T-V domains at a plurality of positions X along a seismic line of exploration, each (T,V,X,C') point representing travel time T and velocity V location of a regional coherency maximum C' on one of the plurality of velocity spectra in a T-V domain at a position X along the seismic line of exploration; and inputting selected points in the displayed T-X domain and mathematically relating the selected points and defining a horizon function F(T,X) between the variables of the displayed domain;

associating velocities of -(T,V,X,C')- adjacent the thus defined horizon with the thus defined horizon function F(T,V) and generating a horizon-velocity function F(T,V,X) and displaying the resulting horizon velocity function F(T,V,X) in the V-X domain, said associating step comprising one of (1) associating velocity values obtained by interpolating to the horizon function F(T,X) velocity values of (T,V,X,C') points having T values adjacent the horizon function F(T,X), (2) associating velocity values obtained by interpolating to the horizon velocity function F(T,X) velocity values of (T,V,X,C') points having T values with a selected range of T values adjacent to the horizon function and F(T,X) and (3) associating velocity values of (T,V,X,C') points having T values adjacent the horizon function F(T,X) with the horizon function F(T,X), thus forming the horizon velocity function F(T,V,X).

23. Method for geophysical exploration comprising:

projecting onto and displaying in a single plane in at least the T-V domain, and optionally in the T-X and V-X domains a set -(T,V,X,C')- of velocity spectra local coherency maxima points (T,V,X,C') from a plurality of velocity spectra in T-V domains at a plurality of positions X along a seismic line of exploration, each (T,V,X,C') point representing travel time T and velocity V location of a regional coherency maximum C' on one of the plurality of velocity spectra in a T-V domain at a position X along the seismic line of exploration;

third variable visual value means for assigning different visual values to different values of X being displayed in the T-V domain; and defining a function in the displayed domain by inputting selected points in the displayed domain by operations functionally connected to the displayed domain and for mathematically relating the selected points and defining a function between the variables of the displayed domain.

24. The method of claim 23 further comprising editing for generating the set -(T,V,X,C')-, the editing comprising:

determining at least one window Δ in a range selected from X,V,T for T-V, T-X, and V-X domains respectively and producing a selected window set Δ -(T,V,X,C')-of a set -(T,V,X,C')-.

25. The method of claim 24 determining a window ΔX in the X range for the T-V domain and producing a selected window set ΔX -(T,V,X,C')-.

26. The method of claim 23 further comprising editing for generating the set -(T,V,X,C')-, the editing comprising:

defining at least one of fairways $R_{TV}$, $R_{TX}$, $R_{VX}$ for T-V, T-X and V-X domains respectively and producing selected fairways sets R -(T,V,X,C')- of a set -(T,V,X,C')-.

27. The method of claim 26 further comprising editing for generating the set -(T,V,X,C')-, the comprising editing for generating the set -(T,V,X,C')-, the editing comprising:

defining at least a fairway $R_{TV}$ in the T-V domain and defining a fairway $R_{TX}$ in the T-X domain and producing an $R_{TV}$ fairway set -(T,V,X,C')- and an $R_{TX}$ fairway set -(T,V,X,C')-;

producing a union set of the $R_{TV}$ fairway set and the $R_{TX}$ fairway set; and projecting and displaying the resulting union set in the T-V domain.

28. The method of claim 27 comprising:

determining ΔX windows at at least two positions X along the seismic line and producing at least two ΔX window sets;

defining $R_{TV}$ fairways in projected displays of each of the ΔX window sets and interconnecting thus defined $R_{TV}$ fairways and producing an $R_{TV}$(T,V,X) fairway set in T,V,X space;

delineating and producing an $R_{TX}$ (T,V,X) fairway set in T,V,X space; and producing a union set of the $R_{TV}$(T,V,X) fairway set and the $R_{TX}$ (T,V,X) fairway set.

29. The method of claim 23 further comprising:

assigning visual values to a third variable for representing the third variable in a selected two-variable domain selected from T-V, T-X, and V-X domains.

30. The method of claim 28 further comprising:

assigning visual values to coherency peaks C' magnitude for displaying in the T-V domain; and assigning visual values to a selected one of coherency peaks C' magnitude and stacking velocity V for displaying the selected one in the V-X domain.

31. The method of claim 24 further comprising:

determining a range of a selected window $\Delta$; and setting the position of a corresponding window $\Delta$ at a particular value of the window variable.

32. The method of claim 27 comprising:

defining a horizon function $F(T,X)$ in the T-X domain.

33. The method of claim 23 comprising:

projecting and displaying a set of -(T,V,X,C')-in a T-X domain; and assigning visual values to coherency peak C' magnitude for displaying coherency magnitudes in the T-X domain; and defining a horizon function in the displayed T-X domain; and associating velocity values of adjacent -(T,V,X,C')- with the defined horizon function in the T-X domain.

34. The method of claim 23 comprising:

projecting and displaying a defined horizon function having associated velocity values in a V-X domain; and defining a horizon velocity function in the displayed V-X domain.

35. The method of claim 24 further comprising:

associating visual values with a defined horizon function.

36. The method of claim 23 further comprising editing for generating the set -(T,V,X,C')-, the editing comprising:

determining at least one window $\Delta$ in a range selected from X,V,T for T-V, T-X and V-X domains respectively and producing a selected window set $\Delta$ -(T,V,X,C')-of a set -(T,V,X,C')-;

defining at least one of fairways $R_{TV}$, $R_{TX}$, $R_{VX}$ for T-V, T-X and V-X domains, respectively, and producing a selected fairway set R -(T,V,X,C')- in a selected domain; and selecting and displaying in selected domains selected ones of the selected window sets $\Delta$ and the selected fairway sets R.

37. The method of claim 36 further comprising:

producing a selected set {(T,V,X,C')} by one of unioning and intersecting selected ones of the selected window sets $\Delta$ and the selected fairway sets R;

projecting and displaying resulting unioned/intersected set in a selected domain.

38. The method of claim 27:

determining a $\Delta X$ window in an T-X domain and producing a window set $\Delta X$ {(T,V,X,C')};

defining at least an $R_{TV}$ fairway in a T-V domain and producing an $R_{TV}$ fairway set $R_{TV}$ {(T,V,X,C')};

producing a selected set {(T,V,X,C')} by unioning $\Delta X$ {(T,V,X,C')} and $R_{TV}$ {(T,V,X,C')}; and defining an $F(T,V)$ function from the unioned set.

39. The method of claim 25 comprising:

determining at least one window $\Delta X$ at a selected position X along the seismic line and producing a selected $\Delta X$ window set; and projecting and displaying the selected $\Delta X$ window set in the T-V domain; and defining a relation set $R_{TV}$ of the projected and displayed selected $\Delta X$ window set; and defining a function $F(T,V)$ from a projected and displayed T-V domain of one of the union and intersection of the $\Delta X$ window set and the $R_{TX}$ relation set.

* * * * *

UNITED STATES PATENT AND TRADEMARK OFFICE
CERTIFICATE OF CORRECTION

PATENT NO. : 4,984,220

DATED : January 8, 1991

INVENTOR(S) : John H. Bodine, et al.

It is certified that error appears in the above--identified patent and that said Letters Patent is hereby corrected as shown below:

Claim 21, Column 18, line 67, "position C" should read --position X--.

Claim 22, Column 19, line 27, "apparatus" should read --method--; line 55, delete "velocity", first occurrence.

Claim 23, Column 20, line 7, delete "third variable visual value means for".

Signed and Sealed this

Seventeenth Day of November, 1992

Attest:

DOUGLAS B. COMER

*Attesting Officer*  *Acting Commissioner of Patents and Trademarks*